Oct. 21, 1924. 1,512,084
H. D. CHURCH
MOTOR VEHICLE
Filed March 20, 1919  2 Sheets-Sheet 2
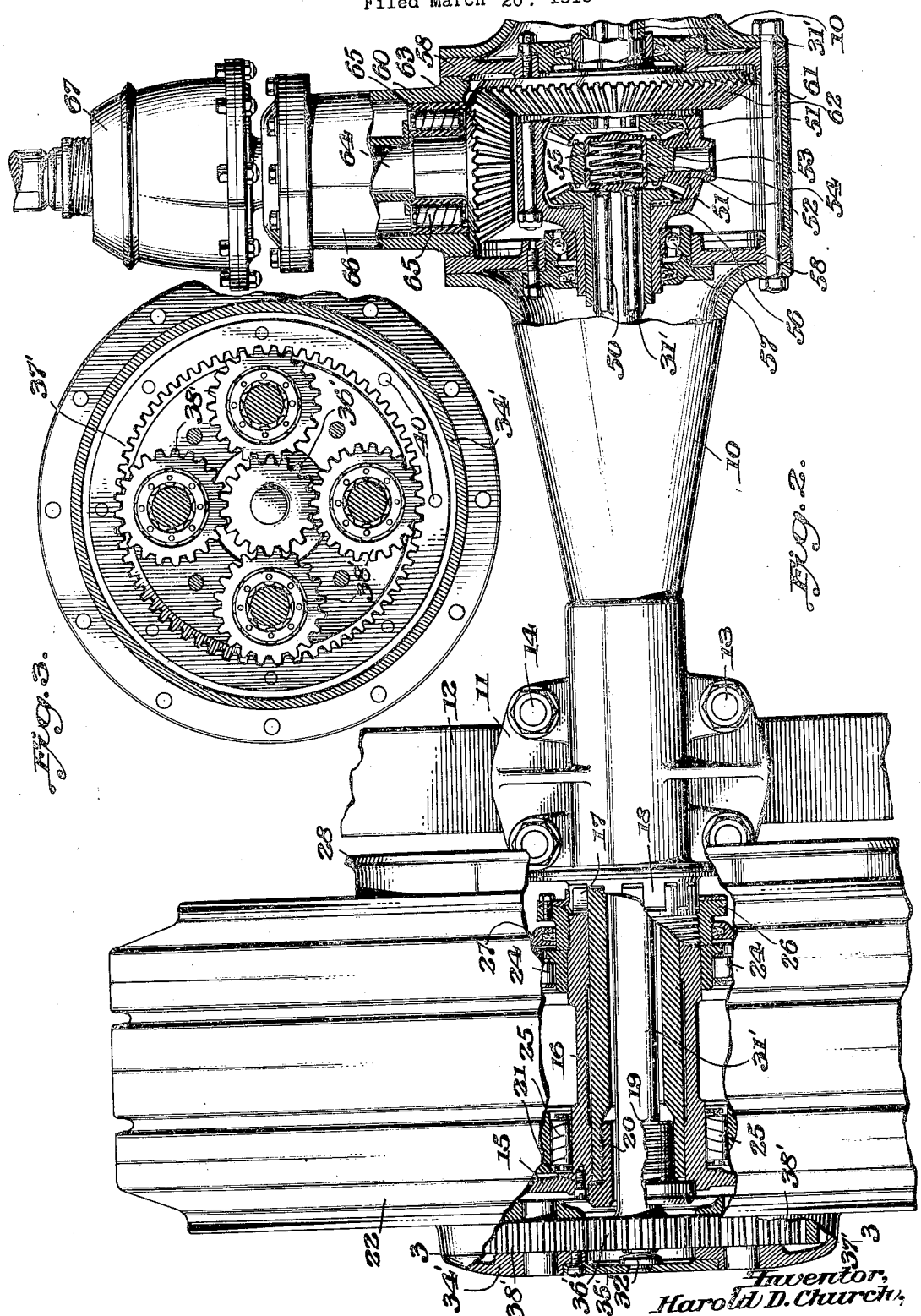
Inventor,
Harold D. Church,
By Milton Tibbetts Atty.

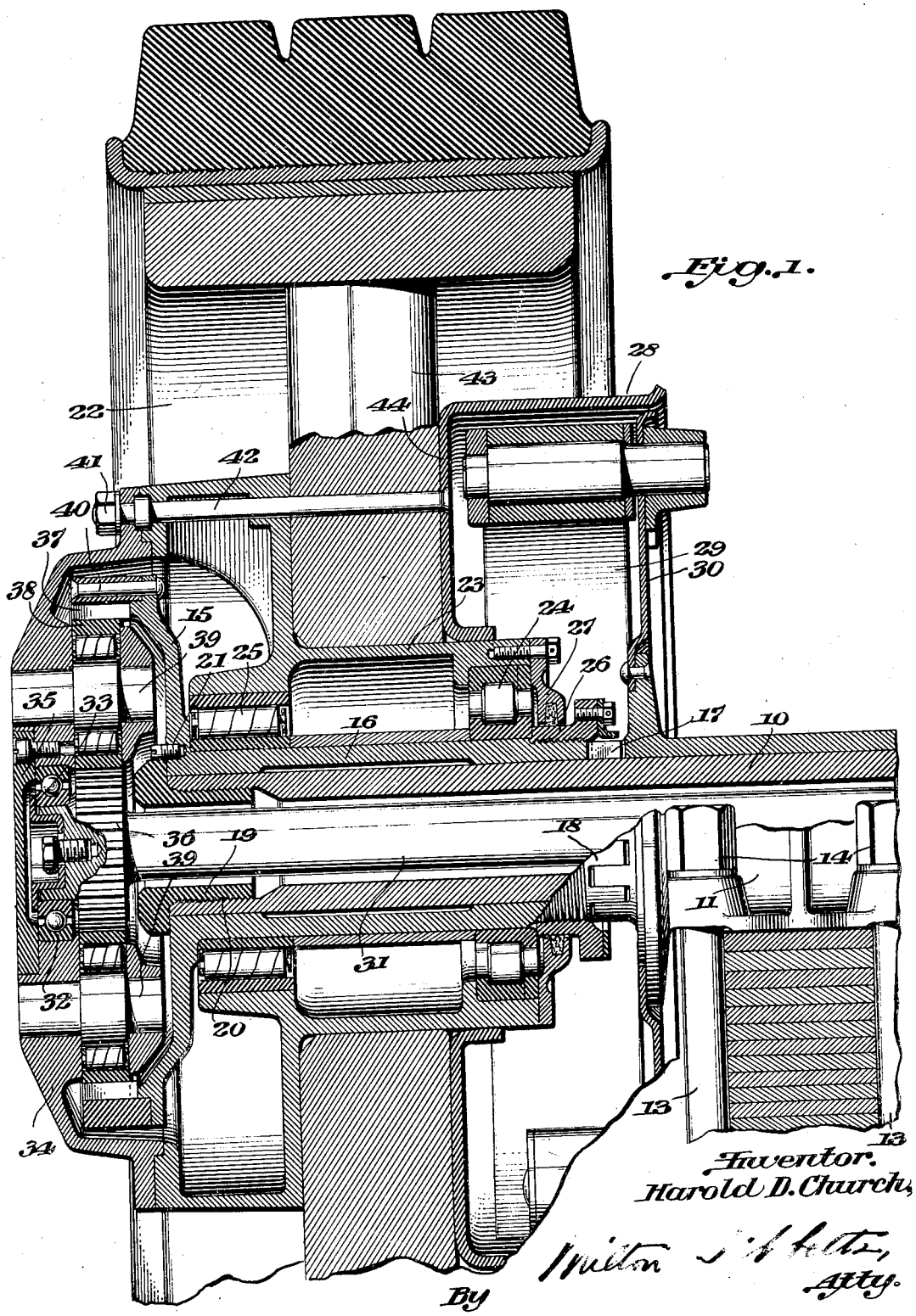

Patented Oct. 21, 1924.

1,512,084

UNITED STATES PATENT OFFICE.

HAROLD D. CHURCH, OF DETROIT, MICHIGAN, ASSIGNOR TO PACKARD MOTOR CAR COMPANY, OF DETROIT, MICHIGAN, A CORPORATION OF MICHIGAN.

MOTOR VEHICLE.

Application filed March 20, 1919. Serial No. 283,789.

*To all whom it may concern:*

Be it known that I, HAROLD D. CHURCH, a citizen of the United States, and resident of Detroit, Wayne County, State of Michigan, have invented certain new and useful Improvements in Motor Vehicles, of which the following is a specification.

This invention relates to motor vehicles and particularly to wheel and axle construction.

One of the objects of the invention is to provide a simple and strong wheel and axle construction of the type in which a planetary gear is arranged in the hub of the wheel.

Another object of the invention is to provide a construction of the above type with means for transferring the torque reaction from the gearing directly to the spring pad of the axle.

Another object of the invention is to simplify the mounting of the driving shaft or live axle section in an axle of the above type.

Another object of the invention is to simplify and strengthen the various parts of an axle of the above type.

Another object of the invention is to provide an axle construction in which the differential gearing is supported on plate members mounted between a middle axle member and outer axle members.

Other objects of the invention will appear from the following description taken in connection with the drawings, which form a part of this specification, and in which:

Fig. 1 is a vertical section through a wheel and axle construction of a motor vehicle embodying the invention;

Fig. 2 is a horizontal section and partial plan view of a wheel and axle construction showing a slightly different form of mounting for the driving shaft or axle section, this view also showing the middle part of the axle; and Fig. 3 is a transverse section substantially on the line 3—3 of Fig. 2.

Referring particularly to the form shown in Fig. 1 10 represents an axle or supporting member and as shown it is of tubular form and has mounted thereon a spring pad 11. A spring 12 is clamped to the pad 11 as by U-bolts 13 and nuts 14.

The present axle is designed particularly for transferring the drive and torque reaction to the frame of the vehicle through the springs and it will be understood therefore that the spring 12 will have one of its ends so connected to the frame that the drive may be carried through it to the frame. This type of drive or this method of transferring the drive from the axle to the frame without a separate torsion rod is usually referred to as the "Hotchkiss drive." It will be understood however that some features of the invention are not limited to application with this type of drive.

The present invention also contemplates transferring the torque reaction of the gearing hereinafter described directly from the gearing or a member thereof to the spring pad instead of transferring it to the axle tube and from the axle tube to the spring pad. Thus a torque reaction member 15 is formed with a sleeve 16 which fits upon the outer end of the axle tube 10 and which is provided with jaws or teeth 17 at its inner end to cooperate with similar teeth 18 formed integral with or otherwise upon the spring pad 11. This member 15 is retained on the axle with its teeth in engagement with the teeth of the spring pad, by means of a nut 19 threaded to the outer end of the axle as shown at 20. A lock screw 21 prevents the nut from turning after it has been properly positioned.

With the above construction, the sleeve 16 becomes a bearing member for the road wheel 22, and the hub 23 of which has separated bearings 24 and 25 with their inner races resting on the sleeve 16. A ring 26 threaded on the inner end of the sleeve 16 retains the bearings and the wheel on the sleeve and a packing ring 27 secured to the inner end of the hub 23 operates on the outer surface of the ring 26 to prevent foreign matter from getting into the bearings at that end of the hub.

The wheel 22 may be provided with a brake flange 28 which will cooperate with brake shoes 29 mounted upon a bracket 30 on the spring pad 11.

Within the axle tube 10 is a driving shaft or live axle section 31. Its inner end is supported in the usual differential gearing (not shown in Fig. 1), and its outer end is mounted in a bearing 32 the inner race of which is retained on the end of the shaft 31 by a disk 33, and the outer race of which is mounted in an outer hub member 34, a removable plate 35 retaining the bearing therein. By this construction the shaft 31 is mounted to rotate concentrically with the wheel 22 mounted on the exterior of the axle tube.

In the space formed between the torque reaction member 15 and the outer hub member 34 above referred to is a planetary gearing set the driving pinion 36 of which is on the shaft 31, the stationary torque reaction gear 37 of which is mounted upon the member 15, and the intermediate or planetary gear 38 of which is mounted upon a suitable spindle 39 eccentrically arranged in the member 34. There may be one or more of these intermediate gears 38. Two of them appear in Fig. 1, and Fig. 3 shows that there are four of these planetary gears. As shown the gear 37 which is an internal spur gear is separately formed and is secured to the member 15 as by bolts 40.

The outer hub member 34 is detachably secured to the hub member 23 as by nuts 41 on the bolts 42, the latter passing through the wheel spokes 43 and the plate portion 44 of the brake flange 28. Thus by removing the nuts 41 the hub member 34 may be removed and with it the planetary gears 38. This will also withdraw the shaft 31 as the connection of its inner end with the differential gearing is a pull-out connection. On the other hand the hub member 34 and the planetary gears may be removed without withdrawing the shaft 31 by first removing the plate 35 and the disk 33. This will permit withdrawal of the bearing 32 without withdrawing the shaft 31. Or if desired, the shaft 31 may be withdrawn without removing the hub member 34, by simply taking off the plate 35 and pulling out the shaft with the bearing 32, the opening for the latter being slightly larger than the pinion 36 for that purpose.

By referring to Fig. 2 it will be seen that certain of the parts thereof are the same as in Fig. 1. Such parts are consequently numbered the same.

The construction of Fig. 2 however differs from Fig. 1 in the mounting of the outer end of the driving shaft. In said Fig. 2 the driving shaft is indicated at 31' and its outer end has a pinion 36' thereon like the shaft of Fig. 1. The shaft however has no bearing support at its outer end but depends entirely upon the planetary pinions 38' shown in Figs. 2 and 3 to center it. These planetary pinions are mounted in the hub member 34' similarly to their mounting in Fig. 1. The removable plate 35' has a centrally located hardened steel button 32' against which the extreme outer end of the shaft 31' abuts. This button is so positioned that the pinion 36' is properly aligned with the gears 38' which gears are of course in a plane with the internal gear 37' with which they mesh.

At its inner end the shaft 31' is splined as shown at 50 and slidably engages the sleeve of a gear 51 forming part of the differential mechanism. There is of course a corresponding shaft 31' and gear 51 in the other half of the axle structure and between these gears 51 are arranged the differential pinions 52 one of which is shown in Fig. 2. The differential pinions are mounted on a spider 53 the middle part of which is drilled out. A coil spring 54 is arranged in the opening in the spider 53 between two disks 55 which are thereby pressed against the extreme inner ends of the shafts 31'. Preferably the outer surfaces of the disks 55 and the button 32' are spherical in shape so that practically only a point contact is made between those surfaces and the ends of the shafts. This causes little or no friction between the parts and the spring keeps a constant pressure outwardly against both of the shafts 31' to thereby prevent undue end play and to keep the pinions 36' in correct position.

The sleeves of the gears 51 are suitably mounted in a differential carrier or housing 56 which in turn is mounted in a pair of bearings 57 in plates 58 arranged on either side of the gear carrier. Packing members 59 are secured to these plates as shown to prevent the lubricant from escaping towards the outer ends.

The plates 58 are arranged on either side of a central housing member 60 and between that member and the main axle or supporting members 10, referred to particularly in connection with Fig. 1. The inner ends of these members 10 may be formed as expanded integral parts of the outer tubular section thereof or the outer tubular section may be separately formed and properly secured to the inner section of this axle member.

The axle members 10, the plates 59, and the middle part 60 of the axle may be rigidly and detachably secured together by several bolts 61 one only of which is shown in Fig. 2.

Mounted upon the differential carrier 56 is driven bevel gear 62 which meshes with a driving pinion 63 carried on a driving shaft 64 which latter shaft is mounted in suitable bearings 65 in an extension 66 of the axle part 60. A universally jointed shaft 67 connects with the shaft 64 in the usual manner.

Other forms may be used without departing from the spirit or scope of the invention.

Having thus described my invention, what I claim and desire to secure by Letters Patent is:—

1. In wheel and axle construction the combination with an axle member and a spring pad mounted thereon, of a road wheel mounted to rotate about the axle member, a driving shaft, a torque reaction member extending through the wheel hub to the spring pad, and gearing from the driving shaft to the wheel including an internal gear mounted on the torque reaction member.

2. In wheel and axle construction, the combination with an axle member and a spring pad mounted thereon, of a road wheel mounted to rotate about the axle member, a driving shaft, a torque reaction member on the axle member connected directly to said spring pad, the bearings of said road wheel resting on said torque member, and gearing from the driving shaft to the wheel including a gear mounted on said torque member.

3. In wheel and axle construction, the combination with an axle member and a spring pad mounted thereon, of a road wheel mounted to rotate about the axle member, a driving shaft, a torque reaction member on the axle member connected directly to said spring pad, the bearings of said road wheel resting on said torque member, and gearing from the driving shaft to the wheel including an internal gear mounted on the torque reaction member.

4. In a wheel and axle construction, the combination with an axle member and a spring pad mounted thereon, of a road wheel, a drive shaft extending through the axle and having a pinion thereon, a planetary gear mounted on the wheel in mesh with said pinion, a torque reaction member having a gear cooperating with said planetary gear and having a sleeve extending through the hub of the wheel to the spring pad, said sleeve and spring pad having interengaging teeth, bearings for the wheel on said sleeve and means for retaining the torque reaction member on the axle.

5. In a wheel and axle construction, the combination with an axle member and a spring pad mounted thereon, of a road wheel, a drive shaft extending through the axle and having a pinion thereon, a planetary gear mounted on the wheel in mesh with said pinion, a torque reaction member having a gear cooperating with said planetary gear and having a sleeve extending through the hub of the wheel to the spring pad, said sleeve and spring pad having interengaging teeth, and bearings for the wheel on said sleeve.

6. In wheel and axle construction, the combination with a stationary axle member, a wheel mounted thereon, a driving shaft extending through the axle and having a pinion near its outer end, means supporting the shaft at the end thereof, gearing from said pinion to the wheel, a hub member on said wheel covering said gearing, said hub member having an opening in line with said shaft large enough for said pinion and said means to pass through, and a detachable cover over said opening.

7. In wheel and axle construction, the combination with a stationary axle member, a wheel mounted thereon, a driving shaft extending through the axle and having a pinion at its outer end, gearing from said pinion to the wheel, a hub member on said wheel covering said gearing, and supporting the outer end of the shaft, said hub member having an opening in line with said shaft large enough for said pinion to pass through, and a detachable cover for said opening.

8. In wheel and axle construction, the combination with a stationary axle member, a wheel mounted thereon, a driving shaft extending through the axle and having a pinion at its outer end, gearing from said pinion to the wheel, a hub member on said wheel covering said gearing, and having a part in contact with said shaft to position the same, said hub member having also a covered opening in line with said shaft large enough to permit said pinion to pass through in removing the shaft.

9. In an axle, the combination with the axle tube, of a spring pad mounted thereon, and an internal gear having withdrawable clutch connection with said spring pad.

In testimony whereof I affix my signature.

HAROLD D. CHURCH.